United States Patent [19]
Kamigaito et al.

[11] 3,903,230
[45] Sept. 2, 1975

[54] METHOD FOR PRODUCING CERAMICS OF SILICON NITRIDE

[75] Inventors: Osami Kamigaito; Yoichi Oyama, both of Nagoya, Japan

[73] Assignee: Kabushiki Kaisha Toyota Chuo Kenkyusho, Japan

[22] Filed: Dec. 20, 1972

[21] Appl. No.: 316,940

[30] Foreign Application Priority Data
Dec. 14, 1971 Japan.......................... 46-104454

[52] U.S. Cl. ............... 264/122; 106/65; 106/73.4; 106/73.5; 264/65; 264/125; 264/322
[51] Int. Cl.[2] ................. C04B 35/64; C04B 35/10
[58] Field of Search............... 106/65, 73.4, 73.5; 264/65, 332, 122, 125

[56] References Cited
UNITED STATES PATENTS

| | | | |
|---|---|---|---|
| 2,636,828 | 4/1953 | Nicholson | 106/65 |
| 3,108,887 | 10/1963 | Lenie | 106/65 X |
| 3,262,761 | 7/1966 | Bechtold | 106/65 X |

FOREIGN PATENTS OR APPLICATIONS
45-22138   1970   Japan.................. 106/65

OTHER PUBLICATIONS
*Introduction to Ceramics* by W. D. Kingery, John Wiley & Sons, Inc., New York, 1967, pp. 162–166.

*Primary Examiner*—Robert F. White
*Assistant Examiner*—Thomas P. Pavelko
*Attorney, Agent, or Firm*—Blum, Moscovitz, Friedman & Kaplan

[57] ABSTRACT

A method for producing silicon nitride base ceramics products having high heat resistance, high abrasion resistance and low thermal expansion from the mixed powders of silicon nitride and alumina or from the mixed powders of silicon nitride, alumina and aluminum nitride. The method includes heating said mixed powders at a temperature between 1650° and 2000°C under a high pressure or no pressure. During the heating most of the alumina and aluminum nitride are occluded in silicon nitride and said silicon nitride base ceramics products are formed.

10 Claims, 1 Drawing Figure

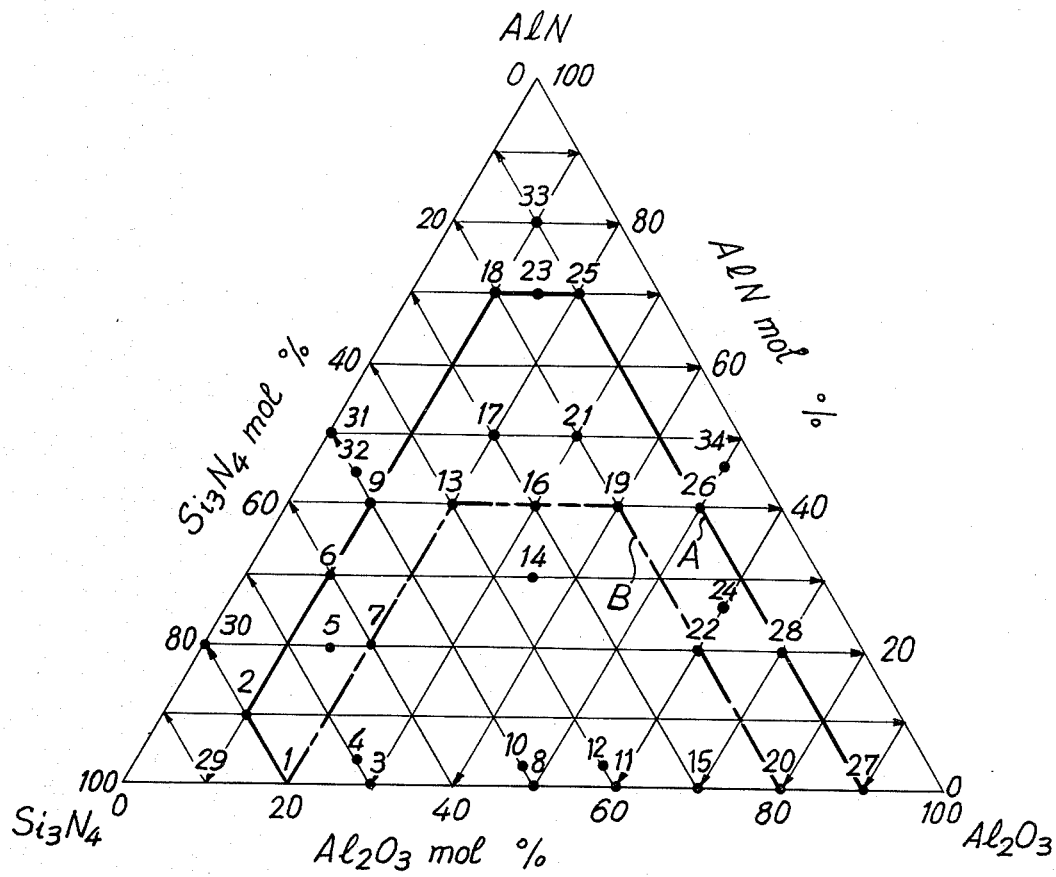

METHOD FOR PRODUCING CERAMICS OF SILICON NITRIDE

BACKGROUND FOR THE INVENTION

Hitherto lithia ($Li_2O$)-alumina-silicate base ceramics, for example β-spodumen and eucriptite, have been known as ceramics having a low thermal-expansion coefficient. Such ceramics are, however, unsatisfactory due to their low heat resistance. For example, these ceramics, which have a low thermal-expansion coefficient ($1.0 \times 10^{-6}/°C \sim 3.0 \times 10^{-6}/°C$) melt at a relatively low temperature (at 1400°C or below 1400°C); therefore the maximum temperature at which they may be used is relatively low. Moreover, ceramics of silicon nitride in which magnesia (MgO) is occluded, have been known as possessing high abrasion resistance. This type of ceramic has therefore been employed for high temperature bearings and the like. However, the abrasion resistance of these ceramics is inadequate for high temperature bearings. During use, abrasion of the ceramics is accelerated due to the powder formed by abrasion from the ceramics themselves.

SUMMARY OF THE INVENTION

Silicon nitride, aluminum nitride and aluminum oxide in the form of fine powders when thoroughly and uniformly mixed in suitable proportions are heated to between 1500°C and 2000°C to produce ceramics which are high in abrasion resistance and corrosion resistance and can be used at temperatures at or in excess of 1400°C. Compositions in accordance with the instant invention range from 10 to 80 mol percent of silicon nitride, 10–90 mol percent of alumina and 0–70 mol percent aluminum nitride.

Preferably, the aluminum nitride content is at least 2 mol percent of the composition. The compositions are mainly composed of a novel phase of a solid solution based on silicon nitride or of the mixture of said novel phase and a novel compound having the lattice constants (d) 2.89, 2.79, 2.61, 2.58, 2.31, 2.15, 2.04, 1.82, 1.496 and 1.39 A with a permissible error range of about 5%.

Accordingly, a principal object of the present invention is to provide an improved method for producing ceramics having high abrasion resistance, high heat resistance and a low thermal-expansion coefficient.

Another object of the present invention is to provide an improved method for producing ceramics which include silicon nitride.

A further object of the present invention is to provide an improved method for producing said ceramics from silicon nitride without decomposition of same.

Yet another object of the present invention is to provide an improved ceramic of silicon nitride, alumina and aluminum oxide having the aforenoted properties.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE is a triangular coordinate diagram showing the composition ranges of the mixed powders which are used to form the ceramics of the present invention.

DESCRIPTION OF THE PREFERRED EMBODIMENTS

The silicon nitride base ceramics products obtained by the present invention have a low thermal-expansion coefficient nearly equal to that of lithia-alumina-silicate base ceramics. Also, the silicon nitride ceramics products have remarkably good heat resistance and oxidation resistance and can be used at about 1400°C or at a temperature above 1400°C in some case. With respect to abrasion resistance, compared with the ceramics composed of the solid solution of magnesia in silicon nitride, the silicon nitride base ceramics of the present invention are superior.

In the present invention, it is very important to control the composition ranges of the mixed powders of silicon nitride and alumina, and of the mixed powders of silicon nitride, alumina and aluminum nitride. Silicon nitride base ceramics having the remarkable characteristics mentioned above can be produced by sintering or hot pressing in non-oxidizing atmosphere at a temperature between 1650° and 2000°C mixed powders composed of 10 to 80 mol percent of silicon nitride, 10 to 90 mol percent alumina and 0 to 70 mol percent of aluminum nitride. The composition ranges of each component are shown in the area enclosed by the lines joining points 1, 2, 18, 25 and 27 on the triangular coordinate diagram in the accompanying FIGURE. An important range of compositions is bounded by the bottom line.

The composition diagram is prepared in the form of a regular triangle. All the sides of the diagram have corresponding scales. The left-hand and right-hand sides represent the silicon nitride content and the aluminum nitride content, respectively, while the bottom side represents the alumina content. A line parallel to the bottom line represents a constant aluminum nitride content. Any line parallel to the left side line or the right side line, respectively represents a constant alumina content and a constant silicon nitride content. Each composition indicated with the points in the FIGURE is listed in the accompanying table. The percentages (%) used in this specification represent mol percentages except where otherwise indicated. The sintering time should be between about 10 and 40 minutes, this period being necessary for a solid solution of $Si_3N_4$ to form. The pressure range is preferably 100 kg/cm² to 300 kg/cm².

With respect to the ceramics obtained by the present invention, it was recognized that these are mainly composed of a novel phase of a solid solution based on silicon nitride or of the mixture of said novel phase and a novel compound having the following lattice constants (d), 2.89, 2.79, 2.61, 2.58, 2.31, 2.15, 2.04, 1.82, 1.496 and 1.39 (A). Said lattice constants include permissible error range, about 5%, caused by the measuring technique. It is not clear why the ceramics of the novel phase have such a high abrasion resistance, but it is thought that relatively many empty lattice points are formed in said novel phase because alumina is occluded in silicon nitride, and microstress fields are formed because of the existence of these lattice defects; these microstress fields are considered to be responsible for the excellent hardness and the abrasion resistance of the resultant ceramic. The lattice structure of the novel compound has not been established; however, the compound can be defined as that having the given lattice constants. The ceramics obtained by the present invention are composed of more than 80% by weight of said novel phase of the solid solution or of the mixture of said novel phase of the solid solution and the novel compound. The thermal-expansion coefficient of the ceramics is about $30 \times 10^{-6}$/°C or less. Also, it is recognized that the ceramics have about 1.5 to 5 times superior abrasion resistance and nearly equal or a little superior oxidation resistance to those of conventional silicon nitride-magnesia base ceramics.

Further, the ceramics formed by hot pressing from the mixed powders composed of 20 to 80 mol percent of silicon nitride, 20 to 80 mol percent of alumina and 0 to 40 mol percent of aluminum nitride within the composition ranges shown in the area encircled by the lines joining points 1, 13, 19 and 20 on the diagram have a remarkably low thermal-expansion coefficient (about $2.5 \times 10^{-6}$/°C or lower) in addition to high abrasion resistance. Said area is also bounded by broken line B and the bottom line. Again, each of the compositions of the mixed powder at each point is listed in the table. The ceramics in this region contain large amounts of the novel phase of the solid solution based on silicon nitride compared with that of the ceramics formed from the mixed powders within the other composition ranges.

Hitherto, it was thought that the thermal expansion coefficient of silicon nitride alumina base ceramics becomes higher if the content of alumina in the ceramics increases over 20 mol percent. This position is correct as far as said alumina exists as α-alumina in the ceramics. However, it is not true when said alumina is occluded in silicon nitride. The ceramics composed of a solid solution of alumina in silicon nitride show a remarkably low thermal-expansion coefficient even though the alumina content is as much as 80 mol percent. Also, the oxidation and heat resistances of said ceramics are very good. The limit of the solid solution of alumina in silicon nitride is about 80 mol percent, so the alumina content in the mixed powders must be 80 mol percent or lower.

Aluminum nitride in the mixed powders of the present invention works to improve abrasion resistance of the silicon nitride base ceramics and to promote the formation of the solid solution of alumina in silicon nitride. Practically, if aluminum nitride is not included into the silicon nitride, it is necessary to heat material powder at a high temperature for a long time in order to occlude alumina in silicon nitride, under such a condition both alumina and silicon nitride are apt to be lost by evaporation during the step of forming a solid solution of alumina in silicon nitride so that ceramics of the desired composition are not obtained so easily.

In contrast, when about 2 mol percent of aluminum nitride is added to the mixed powders of silicon nitride and alumina, the solid solution of alumina in silicon nitride is very easily formed and little evaporation of alumina and silicon nitride occurs under the same condition mentioned above. For example, the mixed powders of 55 mol percent of silicon nitride and 45 mol percent of alumina (aluminum nitride was not included) were sintered at 1700°C for 30 minutes in a nitrogen atmosphere at a pressure of 250 kg/cm² to obtain 5 samples. Two out of the 5 samples lost more than 20 weight percent and the other 3 samples lost less than 5 weight percent. The chemical analysis of the samples which lost about 20 weight percent of the weight during the sintering showed weight decrease mainly caused by the disappearance of alumina. In contrast, the mixed powders of 52 mol percent of silicon nitride, 45 mol percent of alumina and 2 mol percent of aluminum nitride, and that of 45 mol percent of silicon nitride, 45 mol percent of alumina and 10 mol percent of aluminum nitride were sintered at 1750°C for 30 minutes under a pressure of 250 kg/cm² to obtain respectively 5 samples of each composition.

There was no weight decrease of over 5%. It is thought that the ionic bonding of alumina is weakened somewhat, and that the formation of a solid solution of alumina in silicon nitride is promoted because of the presence of aluminum nitride which includes the same element as does alumina and has relatively strong covalent characteristics. Because the weight decrease is prevented by the addition of aluminum nitride into the mixed powders, the weight of the ceramics produced can be precisely controlled, so that the formation of defective products can be almost prevented. Furthermore, it is recognized that the distribution of alumina in the form of solid solution within the heat and abrasion resistant ceramic is rendered homogeneous and the quality of the ceramics is consequently uniformly satisfactory.

In the case of the present invention, it is preferable to maintain the temperature of heat treatment from 1650° to 2000°C. When the heating temperature is at about 1600°C, the sintering operation cannot be completely carried out with certain compositions, and when the said heating temperature is over 2000°C, silicon nitride is evaporated to a large extent, so that the ceramic produced is of relatively poor quality. The density of the sintered material is increased if the sintering is carried out under pressure. Also, the sintering operation must be carried out in nonoxidizing atmosphere.

Following is the procedure used in preparing test specimens:

PROCEDURE

Mixed powders consisting of silicon nitride fine powder (passable through 200 mesh), alumina fine powder and aluminum nitride fine powder (both passable through 400 mesh) were pressed at high temperature in a nitrogen atmosphere with a punch in a graphite die having an inner diameter of 40 mm. The heating temperature was 1500° to 1800°C, the heating period was 10 minutes to 40 minutes and the pressure was 100 kg/cm² to 300 kg/cm².

Each sample was cooled after the sintering operation, and then porosity, oxidation resistance, abrasion resistance and coefficient of thermal-expansion thereof were measured. The elements included in each sample were analyzed by means of an electron probe microanalyzer and the compounds present were analyzed by means of X-ray diffraction and the quantity present was determined by the intensity of diffracted X-rays.

The abrasion resistance was determined by the following method: Each sample of 40 mm diameter was ground against a cast iron lapping surface for 12 hours under the condition of 43 m/min abrasive speed and 25 g/cm² surface pressure, with 300 mesh silicon carbide after which the weight decrease of the sample was measured.

The oxidation resistance was measured as follows: Each sample of 40 mm diameter was ground with 800 mesh silicon carbide to form a smooth surface, and then was oxidized for 48 hours at 1200°C in an electric furnace in air after which the weight gain was measured. The coefficient of thermal-expansion was measured in air by means of a dilatometer.

The treatment condition and the measured result of the obtained material will be shown in the table below. For comparison, the measured result of the sample obtained by sintering silicon nitride with 5 mol percent of magnesia is also known. In the table, $\alpha$ denotes coefficient of thermal-expansion. $P_o$ denotes porosity.

As shown in the table and in the single FIGURE in which the values of the said table are plotted (the reference numerals in the drawing correspond to the numbers of the samples in the table), when compositions of mixed powders consisting of 10–80 mol percent of silicon nitride, 10–90 mol percent of alumina and 0–70 mol percent of aluminum nitride (samples 1 to 28 lying in the area bounded with the line A and the bottom line in the drawing) are sintered, many kinds of sintered products are obtained in which the solid solution of silicon nitride of the said solid solution and the novel compound are included as the main components constituting more than 80 mol percent of the sintered material. The abrasion resistance is very good; namely, the abraded quantity of each sintered material is about 1 gr. or less and also the coefficient of thermal-expansion thereof is very low; namely, it is about $3 \times 10^{-6}/°C$ or less.

Table

| Sample | Mixed Powder $Si_3N_4$ (m/o) | $Al_2O_3$ (m/o) | AlN (m/o) | Treatment Condition Pressure (kg/cm²) | Temp. (°C) | Time (min) | $P_o$ (%) | Measured result Oxidation increment (mg/cm²) | Abraded quantity (gr) | $\alpha$ ($\times 10^{-6}/°C$) | Compound | |
|---|---|---|---|---|---|---|---|---|---|---|---|---|
| 1 | 80 | 20 | 0 | 300 | 1850 | 30 | 10 | 0.7 | 0.69 | 2.4 | $Si_3N_4ss$ | |
| 2 | 80 | 10 | 10 | 300 | 1850 | 30 | 8 | 1.0 | 0.88 | — | $Si_3N_4ss$ | |
| 3a | 70 | 30 | 0 | 200 | 1700 | 30 | 2 | 0.5 | 0.89 | 2.2 | $Si_3N_4ss, Si_3N_4$ | small quantity |
| 3b | 70 | 30 | 0 | 0 | 1750 | 40 | 5 | 0.5 | 0.30 | — | $Si_3N_4ss$ | |
| 4 | 70 | 27 | 3 | 300 | 1600 | 40 | 10 | 0.45 | — | 2.2 | $Si_3N_4ss, Si_3N_4$ | small quantity |
| 5 | 65 | 15 | 20 | 300 | 1750 | 25 | 1 | 0.8 | 0.93 | — | $Si_3N_4ss$ | |
| 6 | 60 | 10 | 30 | 150 | 1850 | 15 | 1 | 0.9 | 0.80 | 2.9 | $Si_3N_4ss, AlN(0~20 w/o)$ | |
| 7 | 60 | 20 | 20 | 250 | 1750 | 30 | 1 | 0.7 | 0.80 | 2.5 | $Si_3N_4ss, AlN(~15 w/o)$ | |
| 8 | 50 | 50 | 0 | 300 | 1750 | 30 | 1 | 0.7 | 0.65 | 2.0 | $Si_3N_4ss, Si_3N_4$ | small quantity |
| 9 | 50 | 10 | 40 | 200 | 1850 | 15 | 1 | 0.9 | 1.01 | — | $Si_3N_4ss, AlN(~3 w/o)$ | |
| 10 | 50 | 47 | 3 | 300 | 1750 | 15 | 1 | 0.65 | 0.58 | 2.2 | $Si_3N_4ss$ | |
| 11 | 40 | 60 | 0 | 200 | 1750 | 30 | 1 | 0.8 | — | 2.1 | $Si_3N_4ss, Si_3N_4$ | small quantity |
| 12 | 40 | 57 | 3 | 200 | 1600 | 30 | 8 | 1.0 | — | 2.0 | $Si_3N_4ss, Si_3N_4$ | small quantity |
| 13 | 40 | 20 | 40 | 200 | 1800 | 25 | 1 | 0.5 | — | 2.5 | $Si_3N_4AlN$ | small quantity |
| 14 | 35 | 35 | 30 | 300 | 1750 | 20 | 1 | 0.6 | — | 2.5 | $Si_3N_4ss$ | |
| 15 | 30 | 70 | 0 | 200 | 1750 | 30 | 1 | 0.9 | 0.70 | 2.4 | $Si_3N_4ss$ | |
| 16 | 30 | 30 | 40 | 250 | 1800 | 25 | 1 | 0.9 | 0.6 | 2.5 | $Si_3N_4ss$ | |
| 17 | 30 | 20 | 50 | 100 | 1600 | 20 | 1 | 0.5 | — | 3.0 | $Si_3N_4ss, Al_2O_3 (~5 w/o), AlN(~17 w/o)$ | |
| 18 | 20 | 10 | 70 | 300 | 1800 | 25 | 1 | 0.7 | 1.02 | — | Novel Compound $Si_3N_4ss$ (~20 w/o) AlN(~10 w/o) | |
| 19 | 20 | 40 | 40 | 250 | 1750 | 30 | 1 | 0.9 | 1.20 | 2.5 | $Si_3N_4ss$ | |
| 20 | 20 | 80 | 0 | 300 | 1800 | 25 | 1 | 0.9 | — | 2.4 | $Si_3N_4ss$ | |
| 21 | 20 | 30 | 50 | 250 | 1750 | 30 | 1 | 0.8 | — | 2.8 | $Si_3N_4ss, AlN(10 w/o)$ Spinel (~13 w/o) | |
| 22 | 20 | 60 | 20 | 200 | 1700 | 25 | 1 | 0.85 | — | 2.3 | Novel Compound $Si_3N_4ss$ (~3 w/o) | |
| 23 | 15 | 15 | 70 | 300 | 1800 | 25 | 1 | 0.7 | 1.00 | — | Novel Compound $Si_3N_4ss$ (25 w/o) AlN(~10 w/o) | |
| 24 | 15 | 60 | 25 | 300 | 1750 | 20 | 1 | 0.8 | 1.25 | — | Novel Compound $Si_3N_4ss$ (8 w/o) Spinel (~3 w/o) | |
| 25 | 10 | 20 | 70 | 200 | 1850 | 20 | 1 | 0.8 | 0.98 | — | Novel Compound $Si_3N_4ss$ (22 w/o) AlN(~10 w/o) | |
| 26 | 10 | 50 | 40 | 250 | 1800 | 30 | 1 | 0.9 | 1.20 | — | Novel Compound $Si_3N_4ss$ (~w/o) Spinel (~5w/o) | |
| 27a | 10 | 90 | 0 | 100 | 1750 | 25 | 1 | 1.0 | 1.40 | — | $Si_3N_4ss, \alpha-Al_2O_3(5w/o)$ | |
| 27b | 10 | 90 | 0 | 300 | 1800 | 25 | 1 | 1.0 | — | 3.1 | $Si_3N_4ss, \alpha-Al_2O_3(25w/o)$ | |
| 28 | 10 | 70 | 20 | 200 | 1700 | 30 | 1 | 1.0 | — | 2.5 | $Si_3N_4ss, \alpha-Al_2O_3(15w/o)$ | |
| 29 | 90 | 10 | 0 | 300 | 1750 | 30 | 15 | 1.5 | 1.5 | — | $Si_3N_4ss, Si_3N_4$ | small quantity |

Table—Continued

| Sample | Mixed Powder Si$_3$N$_4$ (m/o) | Al$_2$O$_3$ (m/o) | AlN (m/o) | Treatment Condition Pressure (kg/cm$^2$) | Temp. (°C) | Time (min) | P$_o$ (%) | Measured result Oxidation increment (mg/cm$^2$) | Abraded quantity (gr) | α (×10$^{-6}$/°C) | Compound |
|---|---|---|---|---|---|---|---|---|---|---|---|
| 30 | 80 | 0 | 20 | 300 | 1850 | 25 | 5 | 1.5 | 2.50 | — | Si$_3$N$_4$, AlN(8w/o) |
| 31 | 50 | 0 | 50 | 300 | 1850 | 25 | 15 | 1.4 | 2.53 | — | Si$_3$N$_4$, AlN(22w/o) |
| 32 | 50 | 5 | 45 | 250 | 1750 | 25 | 3 | 1.2 | 1.55 | — | Novel Compound Si$_3$N$_4$ss (25w/o), AlN(~8 w/o) |
| 33 | 10 | 10 | 80 | 250 | 1900 | 20 | 1 | 0.8 | 1.50 | — | Novel Compound Si$_3$N$_4$ss (15w/o) AlN (~20 w/o) |
| 34 | 5 | 50 | 45 | 250 | 1750 | 25 | 1 | 0.96 | 1.53 | — | Novel Compound Si$_3$N$_4$ss (5w/o) Spinel (~18w/o)AlN(3w/o) |
| 35 | 70 | 30 | 0 | 300 | 1500 | 40 | 20 | 1.1 | 2.00 | — | Si$_3$N$_4$ss, Si$_3$N$_4$(20 w/o), α-Al$_2$O$_3$ (5 w/o) |
| 36 | 40 | 60 | 0 | 200 | 1600 | 30 | 15 | 1.5 | — | 3.2 | Si$_3$N$_4$ss, Si$_3$N$_4$ α-Al$_2$O$_3$(40 w/o) small quantity |
| 37 | 70 | 30 | 0 | 300 | 1600 | 40 | 20 | 1.5 | — | 2.9 | Si$_3$N$_4$ss, Si$_3$N$_4$ α-Al$_2$O$_3$(25 w/o) small quantity |
| 38 | Si$_3$N$_4$95%+MgO5% | | | 300 | 1750 | 30 | 1 | 2.0 | 1.58 | 3.5 | Si$_3$N$_4$ |

Powder quantities in mol %
ss — solid solution

Also, when compositions consisting of 20–80 mol percent of silicon nitride, 20–80 mol percent of alumina and 0–40 mol percent of aluminum nitride (samples 1, 3, 7, 10, 11, 12, 13, 14, 15, 16, 19, 20 and 22 lying in the area bounded by the line B and the bottom line in the drawing), are sintered, each resultant sintered material consists mainly of a solid solution of silicon nitride, and its coefficient of thermal-expansion is about $2.5 \times 10^{-6}$/°C or less, such a low value being valuable for many purposes, especially in resistance to fracture under sudden temperature shock.

Furthermore, in case the silicon nitride content is more than 80 mol percent or less than 10 mol percent (samples 29, 34) in case the alumina is less than 10 mol percent (samples 30, 31, 32) and in case the aluminum nitride is more than 70 mol percent (sample 33), the abrasion resistance of the sintered product is somewhat inferior to those in which the mixed powders lie in composition range of the present invention (the abraded quantity is about 1.5 gr or more). The abrasion resistance of the material such as samples 29, 30, 31, 33 and 34 is nearly equal or a little inferior to the abrasion resistance of the material which is made by occluding magnesia in silicon nitride. It is also recognized that the inferior abrasion resistance of samples 35 and 37 is caused by too low a sintering temperature.

As described above, the sintered material of ceramics obtained according to the present invention has high temperature resistance, high oxidation resistance, high abrasion resistance and low thermal expansion characteristics, so that the said material can be widely employed for bearings, ceramics cutting, blast nozzles and the like.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of producing a hard and dense ceramic composed of a silicon nitride solid solution comprising the steps of forming a powdered mixture consisting essentially of 10 mol percent to 80 mol percent of silicon nitride and 20 mol percent to 90 mol percent of alumina and sintering said mixture at a temperature between 1650° and 2000°C in a non-oxidizing atmosphere for a time between 10 and 40 minutes.

2. A method according to claim 1, wherein said mixture is sintered at a temperature between 1650° and 2000°C for a time ranging from 10 to 40 minutes under a pressure between 100 kg/cm$^2$ and 300 kg/cm$^2$.

3. A method according to claim 1, wherein said mixture consists essentially of 20 mol percent to 80 mol percent of silicon nitride and 20 mol percent to 80 mol percent of alumina.

4. A method of producing a hard and dense ceramic composed mainly of a silicon nitride solid solution comprising the steps of forming a powdered mixture consisting essentially of 10 mol percent to 80 mol percent of silicon nitride, 20 mol percent to 90 mol percent of alumina and up to 70 mol percent of aluminum nitride and sintering said mixture at a temperature between 1650° and 2000°C in a non-oxidizing atmosphere for a time between 10 and 40 minutes.

5. A method according to claim 4, wherein said mixture contains at least 2 mol percent of aluminum nitride.

6. A method according to claim 4, wherein said mixture is sintered at a temperature between 1650° and 2000°C for a time ranging from 10 to 40 minutes under a pressure betwen 100 kg/cm$^2$ and 300 kg/cm$^2$.

7. A method according to claim 4, wherein said mixture consists essentially of 20 mol percent to 80 mol percent of silicon nitride, 20 mol percent to 80 mol percent of alumina and up to 40 mol percent of aluminum nitride.

8. A method according to claim 7, wherein said mixture contains at least 2 mol percent of aluminum nitride.

9. A method of producing a hard and dense ceramic composed mainly of a silicon nitride solid solution comprising the steps of forming a powdered mixture consisting essentially of silicon nitride, alumina and aluminum nitride, the amounts thereof being defined by and included in a polygonal area on a triangular coordinate diagram of silicon nitride, alumina and aluminum nitride, the polygon having five apexes of which the first one being defined by a first ratio of 80 mol percent of silicon nitride and 20 mol percent of alumina, the second one being defined by a second ratio of 80 mol percent of silicon nitride, 10 mol percent of alumina and 10 mol percent of aluminum nitride, the third one being defined by a third ratio of 20 mol percent of silicon nitride, 10 mol percent of alumina and 70 mol percent of aluminum nitride, the fourth one being defined by a fourth ratio of 10 mol percent of silicon nitride, 20 mol percent of alumina and 70 mol percent of aluminum nitride and the fifth one being defined by a fifth ratio of 10 mol percent of silicon nitride and 90 mol percent of alumina, and sintering said mixture at a temperature between 1650° and 2000°C in a non-oxidizing atmosphere for a time between 10 and 40 minutes.

10. A method according to claim 9, wherein said polygon has four apexes of which the first one being defined by a first ratio of 80 mol percent of silicon nitride and 20 mol percent of alumina, the second one being defined by a second ratio of 40 mol percent of silicon nitride, 20 mol percent of alumina and 40 mol percent of aluminum nitride, the third one being defined by a third ratio of 20 mol percent of silicon nitride, 40 mol percent of alumina and 40 mol percent of aluminum nitride and fourth one being defined by a fourth ratio of 20 mol percent of silicon nitride and 80 mol percent of alumina.

* * * * *